United States Patent
Qiu et al.

(10) Patent No.: US 12,137,483 B2
(45) Date of Patent: Nov. 5, 2024

(54) SYSTEMS AND METHODS OF ENHANCED RANDOM ACCESS PROCEDURE

(71) Applicant: ZTE CORPORATION, Guangdong (CN)

(72) Inventors: Zhihong Qiu, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 387 days.

(21) Appl. No.: 17/514,348

(22) Filed: Oct. 29, 2021

(65) Prior Publication Data

US 2022/0264638 A1   Aug. 18, 2022

Related U.S. Application Data

(63) Continuation of application No. PCT/CN2019/085313, filed on Apr. 30, 2019.

(51) Int. Cl.
*H04W 74/0833* (2024.01)
*H04W 72/044* (2023.01)
(Continued)

(52) U.S. Cl.
CPC ..... *H04W 74/085* (2013.01); *H04W 72/0446* (2013.01); *H04W 72/0453* (2013.01);
(Continued)

(58) Field of Classification Search
CPC ........... H04W 74/085; H04W 74/0866; H04W 72/0446; H04W 72/0453; H04W 72/0466; H04W 80/02
See application file for complete search history.

(56) References Cited

U.S. PATENT DOCUMENTS 11,229,062 B2    1/2022  Huang
2018/0205516 A1  7/2018  Jung et al.
(Continued)

FOREIGN PATENT DOCUMENTS

CN    107409317 A    11/2017
CN    107493608 A    12/2017
(Continued)

OTHER PUBLICATIONS

Extended European Search Report for EP Appl. No. 19927557.9, dated Oct. 13, 2022 (11 pages).
(Continued)

*Primary Examiner* — Justin Y Lee
(74) *Attorney, Agent, or Firm* — Foley & Lardner LLP

(57) ABSTRACT

Systems and methods for enhanced random access procedure are provided. A wireless communication device can receive, from a wireless communication node, information indicating a value. The wireless communication device can compare a randomly generated value with the value. The wireless communication device can select, based on the comparison, either a 4-step random access procedure or a 2-step random access procedure to access to the wireless communication node. The wireless communication device can transmit a first message to access to the wireless communication node, wherein content of the first message is based on the selection of the 4-step random access procedure or the 2-step random access procedure.

20 Claims, 8 Drawing Sheets

(51) Int. Cl.
*H04W 72/0446* (2023.01)
*H04W 72/0453* (2023.01)
*H04W 74/08* (2024.01)
*H04W 80/02* (2009.01)

(52) U.S. Cl.
CPC ... *H04W 72/0466* (2013.01); *H04W 74/0866* (2013.01); *H04W 80/02* (2013.01)

(56) References Cited

U.S. PATENT DOCUMENTS

| | | | |
|---|---|---|---|
| 2018/0270869 A1 | 9/2018 | Tsai | |
| 2018/0279375 A1 | 9/2018 | Jeon et al. | |
| 2018/0288810 A1 | 10/2018 | Ishii | |
| 2020/0107372 A1* | 4/2020 | Agiwal | H04W 24/08 |
| 2023/0072506 A1* | 3/2023 | Deogun | H04W 76/11 |

FOREIGN PATENT DOCUMENTS

| | | |
|---|---|---|
| CN | 108282901 A | 7/2018 |
| CN | 108702680 A | 10/2018 |
| CN | 109644326 A | 4/2019 |
| RU | 2628489 C2 | 8/2017 |
| WO | WO-2018/127240 A1 | 7/2018 |
| WO | WO-2018/175809 A1 | 9/2018 |
| WO | WO-2019/029251 A1 | 2/2019 |

OTHER PUBLICATIONS

Nokia et al., "MsgB design", 3GPP TSG-RAN WG2 Meeting #105bis, R2-1903716, Apr. 12, 2019, Xian, China (3 pages).
Nokia et al., "On 2-step RACH Procedure" 3GPP TSG RAN WG1 #96bis, R1-1904716, Apr. 12, 2019, Xi'an, China (16 pages).
Samsung, "2 Step RA: MAC PDU Format for MsgB" 3GPP TSG-RAN2 105bis, R2-1903115, Apr. 12, 2019, Xian, China (3 pages).
International Search Report and Written Opinion of the International Searching Authority for PCT/CN2019/085313 dated Feb. 3, 2020 (9 pages).
First Office Action for RU Appl. No. 2021135129, dated Jul. 12, 2022 (18 pages, with English translation).
First Office Action for CN Appl. No. 202210738798.4, dated May 23, 2024, received Jun. 11, 2024 (with English translation, 14 pages).

* cited by examiner

SYSTEMS AND METHODS OF ENHANCED RANDOM ACCESS PROCEDURE

CROSS-REFERENCE TO RELATED APPLICATION

This application claims the benefit of priority under 35 U.S.C. § 120 as a continuation of PCT Patent Application No. PCT/CN2019/085313, filed on Apr. 30, 2019, the disclosure of which is incorporated herein by reference in its entirety.

TECHNICAL FIELD

The disclosure relates generally to wireless communications and, more particularly, to systems and methods for enhanced random access procedure.

BACKGROUND

In the 5th Generation (5G) New Radio (NR) mobile networks, before a user equipment (UE) can send data to a base station (BS), the UE is required to obtain uplink synchronization and downlink synchronization with the BS. The uplink timing synchronization can be achieved by performing a random access procedure. To meet the demand for faster and efficient communications, the random access procedure is to be enhanced.

SUMMARY

The example embodiments disclosed herein are directed to solving the issues relating to one or more of the existing problems, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes: receiving, from a wireless communication node, information indicating a value; comparing a randomly generated value with the value; selecting, based on the comparison, either a 4-step random access procedure or a 2-step random access procedure to access to the wireless communication node; and transmitting a first message to access to the wireless communication node, wherein content of the first message is based on the selection of the 4-step random access procedure or the 2-step random access procedure.

In another embodiment, an apparatus comprising a processor configured to implement a method. The method includes receiving, by a wireless communication device from a wireless communication node, information indicating a value; comparing, by the wireless communication device, a randomly generated value with the value; selecting, by the wireless communication device based on the comparison, either a 4-step random access procedure or a 2-step random access procedure to access to the wireless communication node; and transmitting, by the wireless communication device, a first message to access to the wireless communication node, wherein content of the first message is based on the selection of the 4-step random access procedure or the 2-step random access procedure.

In yet another embodiment, a computer readable medium having code stored thereon, the code, when executed by a processor, causing the processor to implement a method. The method includes receiving, by a wireless communication device from a wireless communication node, information indicating a value; comparing, by the wireless communication device, a randomly generated value with the value; selecting, by the wireless communication device based on the comparison, either a 4-step random access procedure or a 2-step random access procedure to access to the wireless communication node; and transmitting, by the wireless communication device, a first message to access to the wireless communication node, wherein content of the first message is based on the selection of the 4-step random access procedure or the 2-step random access procedure.

In one embodiment, a method performed by a wireless communication device includes: receiving, from a wireless communication node, information indicating a plurality of values, the plurality of values respectively corresponding to a plurality of parameters; selecting one of the plurality of parameters; comparing a randomly generated value with a value of the plurality of values, the value selected from the plurality of values according to the selected access control parameter; selecting, based on the comparison, either a 4-step random access procedure or a second 2-step random access procedure to access to the wireless communication node; and transmitting a first message to access to the wireless communication node, wherein content of the first message is based on the selecting of the 4-step random access procedure or the 2-step random access procedure.

In another embodiment, an apparatus comprising a processor configured to implement a method. The method includes receiving, by a wireless communication device from a wireless communication node, information indicating a plurality of values, the plurality of values respectively corresponding to a plurality of parameters; selecting, by the wireless communication device, one of the plurality of parameters; comparing, by the wireless communication device, a randomly generated value with a value of the plurality of values, the value selected from the plurality of values according to the selected access control parameter; selecting, by the wireless communication device based on the comparison, either a 4-step random access procedure or a second 2-step random access procedure to access to the wireless communication node; and transmitting, by the wireless communication device, a first message to access to the wireless communication node, wherein content of the first message is based on the selecting of the 4-step random access procedure or the 2-step random access procedure.

In yet another embodiment, a computer readable medium having code stored thereon, the code, when executed by a processor, causing the processor to implement a method. The method includes receiving, by a wireless communication device from a wireless communication node, information indicating a plurality of values, the plurality of values respectively corresponding to a plurality of parameters; selecting, by the wireless communication device, one of the plurality of parameters; comparing, by the wireless communication device, a randomly generated value with a value of the plurality of values, the value selected from the plurality of values according to the selected access control parameter; selecting, by the wireless communication device based on the comparison, either a 4-step random access procedure or a second 2-step random access procedure to access to the wireless communication node; and transmitting, by the wireless communication device, a first message to access to the wireless communication node, wherein content of the first message is based on the selecting of the 4-step random access procedure or the 2-step random access procedure.

In one embodiment, a method performed by a wireless communication device includes: receiving, from a wireless communication node, information indicating a timer; selecting, responsive to determining that the timer is active, a 4-step random access procedure to access to the wireless communication node; selecting, responsive to determining that the timer is inactive, either the 4-step random access procedure or a 2-step random access procedure to access to the wireless communication node; and transmitting a first message to access to the wireless communication node, wherein content of the first message is based on the selection of the 4-step random access procedure or the 2-step random access procedure.

In another embodiment, an apparatus comprising a processor configured to implement a method. The method includes receiving, by a wireless communication device from a wireless communication node, information indicating a timer; selecting, by the wireless communication device responsive to determining that the timer is active, a 4-step random access procedure to access to the wireless communication node; selecting, by the wireless communication device responsive to determining that the timer is inactive, either the 4-step random access procedure or a 2-step random access procedure to access to the wireless communication node; and transmitting, by the wireless communication device, a first message to access to the wireless communication node, wherein content of the first message is based on the selection of the 4-step random access procedure or the 2-step random access procedure.

In yet another embodiment, a computer readable medium having code stored thereon, the code, when executed by a processor, causing the processor to implement a method. The method includes receiving, by a wireless communication device from a wireless communication node, information indicating a timer; selecting, by the wireless communication device responsive to determining that the timer is active, a 4-step random access procedure to access to the wireless communication node; selecting, by the wireless communication device responsive to determining that the timer is inactive, either the 4-step random access procedure or a 2-step random access procedure to access to the wireless communication node; and transmitting, by the wireless communication device, a first message to access to the wireless communication node, wherein content of the first message is based on the selection of the 4-step random access procedure or the 2-step random access procedure.

In one embodiment, a method performed by a wireless communication device includes: transmitting a first message to access to a wireless communication node, wherein content of the first message is based on a selection of a 4-step random access procedure or a 2-step random access procedure; receiving, from the wireless communication node, in response to transmitting the first message, a second message indicating a first timer; and selecting, responsive to determining that the timer is inactive, either the 4-step random access procedure or the 2-step random access procedure to retransmit the first message.

In another embodiment, an apparatus comprising a processor configured to implement a method. The method includes transmitting, by a wireless communication device, a first message to access to a wireless communication node, wherein content of the first message is based on a selection of a 4-step random access procedure or a 2-step random access procedure; receiving, by the wireless communication device from the wireless communication node, in response to transmitting the first message, a second message indicating a first timer; and selecting, by the wireless communication device responsive to determining that the timer is inactive, either the 4-step random access procedure or the 2-step random access procedure to retransmit the first message.

In yet another embodiment, a computer readable medium having code stored thereon, the code, when executed by a processor, causing the processor to implement a method. The method includes transmitting, by a wireless communication device, a first message to access to a wireless communication node, wherein content of the first message is based on a selection of a 4-step random access procedure or a 2-step random access procedure; receiving, by the wireless communication device from the wireless communication node, in response to transmitting the first message, a second message indicating a first timer; and selecting, by the wireless communication device responsive to determining that the timer is inactive, either the 4-step random access procedure or the 2-step random access procedure to retransmit the first message.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
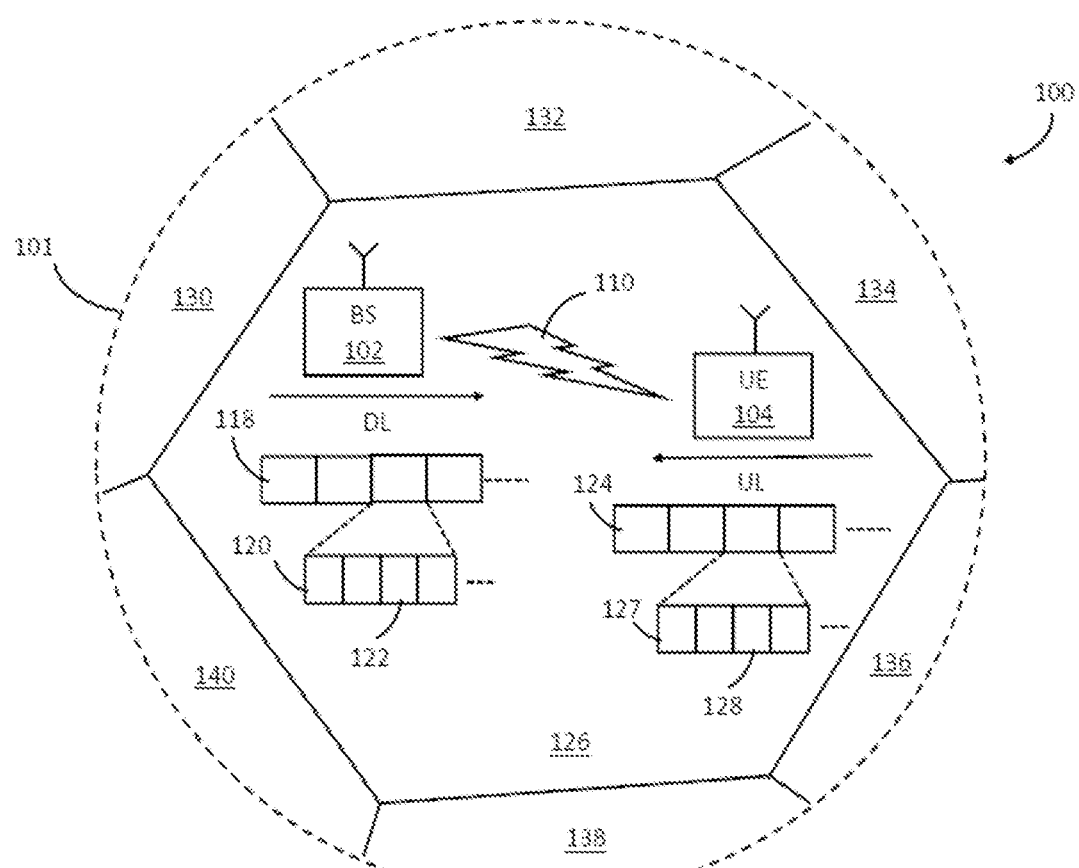
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are respectively described herein as non-limiting examples of "communication node" (or "wireless communication node") and "communication device" (or "wireless communication device") generally, which can practice the methods disclosed herein. Such communication nodes and devices may be capable of wireless and/or wired communications, in accordance with various embodiments of the present solution.

Figure 2:
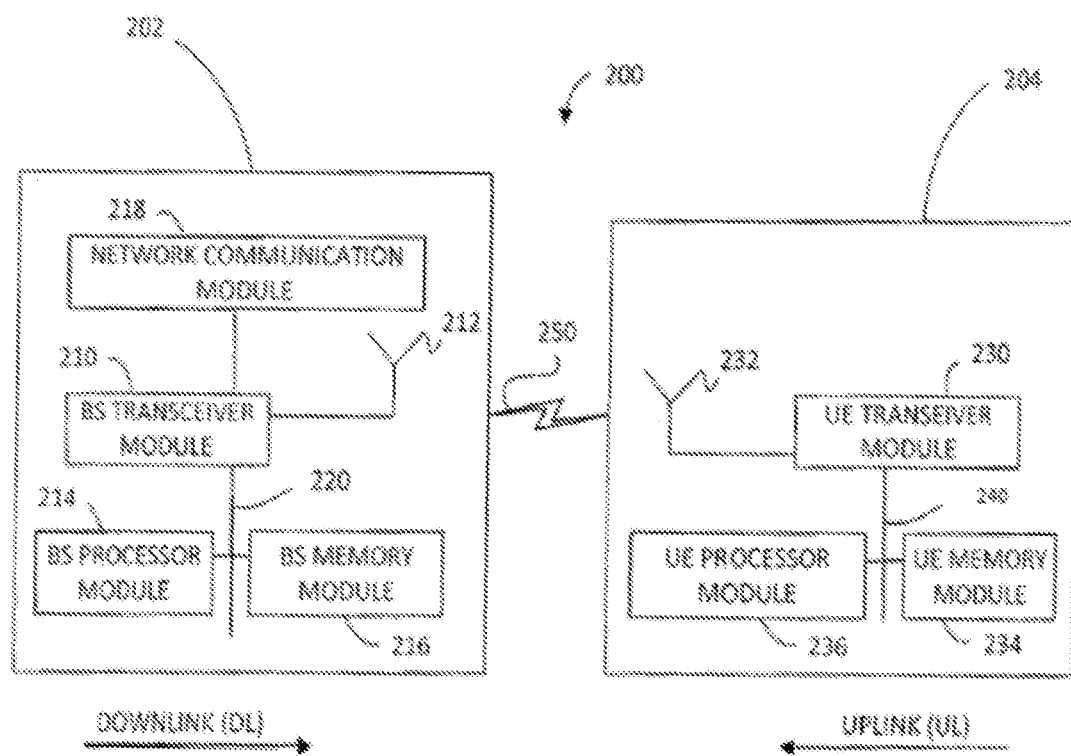
FIG. 2 illustrates block diagrams of an example base station and an example user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a next generation nodeB (gNodeB or gNB), an evolved node B (eNB), a serving eNB, a target eNB, a femto station, a pico station, or a Transmission Reception Point (TRP), for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a process, method, or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Example Random Access Procedures

Figure 3:
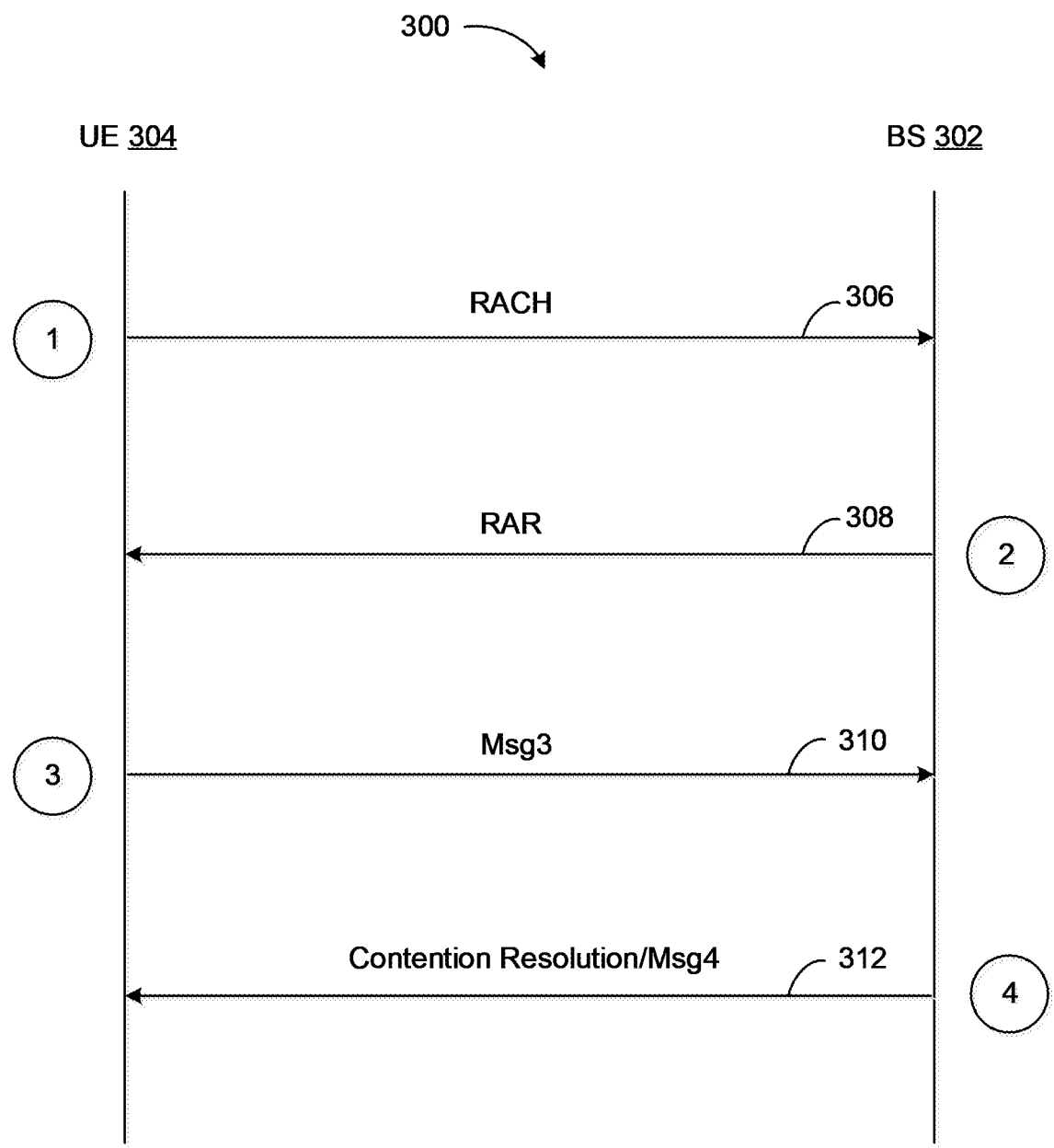
FIG. 3 illustrates an example 4-step random access procedure, in accordance with some embodiments of the present disclosure.

FIG. 3 illustrates an example 4-step random access procedure 300, in accordance with some embodiments of the present disclosure. Referring to FIG. 3, the 4-step random access procedure (RACH) 300 is performed between a BS 302 (e.g., a gNB) and a UE 304. BS 302 and UE 304 may be same or similar to BS 202 and UE 204 in FIG. 2, respectively. In some embodiments, at Step 1 (306), the UE 304 transmits a random access channel (RACH) preamble or physical random access channel (PRACH) preamble in message 1 (Msg1) through an uplink random access channel (RACH) to the BS 302. At Step 2 (308), once the preamble is received successfully by the BS 302, the BS 302 sends a message 2 (Msg2) back to the UE 304, in which a medium access control (MAC) random access response (RAR) can be included as a response to the preamble. At Step 3 (310), once the MAC RAR with a corresponding random access preamble (RAP) identifier (ID) is received, the UE 304 transmits a message 3 (Msg3) to the BS 302 with the grant carried in the MAC RAR. At Step 4 (312), once the Msg3 is received, the BS 302 sends a message 4 (Msg4) back to the UE 304, in which a contention resolution ID can be included for the purpose of contention resolution. In some embodiments, to reduce latency and accelerate the initial access procedure, a 2-step random access procedure can be used, as described in relation to FIG. 4 below.

Figure 4:
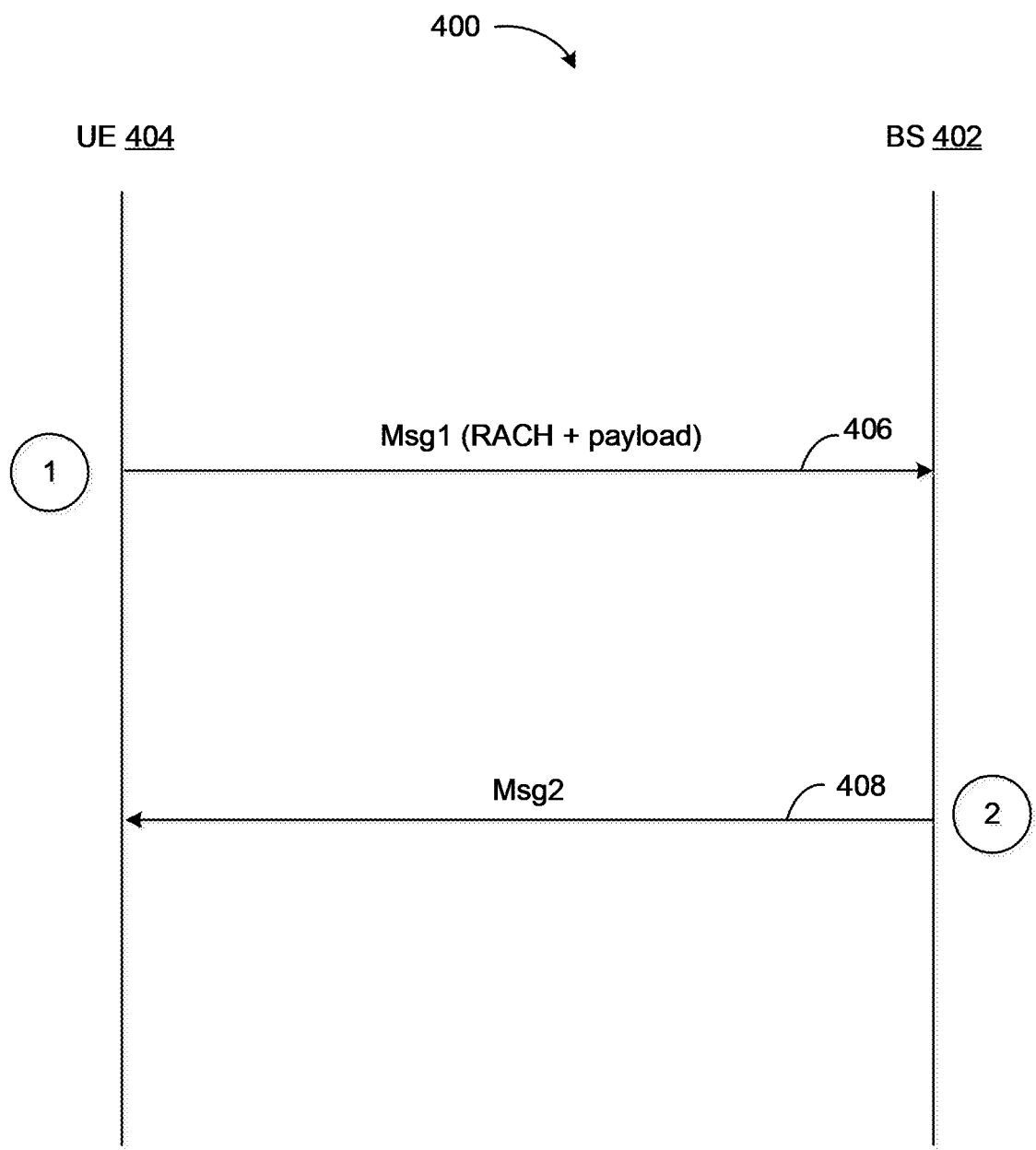
FIG. 4 illustrates an example 2-step random access procedure, in accordance with some embodiments of the present disclosure.

FIG. 4 illustrates an example 2-step random access procedure 400, in accordance with some embodiments of the present disclosure. In some embodiments, a 2-step random access procedure (RACH) 400 can complete the four steps in FIG. 3 in two messages or two steps. In some embodiments, at least some content of the Msg1 and Msg3 in the 4-step RACH are included in Msg1 of the 2-step RACH, and at least some content of the Msg2 and Msg4 (RAR and contention resolution) in the 4-step RACH are included in Msg2 of the 2-step RACH. Referring to FIG. 4, the 2-step random access procedure 400 is performed between a BS 402 (e.g., a gNB) and a UE 404. BS 402 and UE 404 may be same or similar to BS 202 and UE 204 in FIG. 2, respectively. In some embodiments, at Step 1 (406), the UE 404 transmits Msg 1 that includes a preamble and a data payload to a BS 402 for access to the BS 402. In some embodiments, the payload may be optional. In some embodiments, the preamble may be optional. At step 2 (408), the BS 402 transmits Msg2 as a response to the Msg1 to the UE 404. Details of the 2-step random access procedure are described herein below.

C. Random Access (RA) Type Selection Between 2-Step RACH and 4-Step RACH

In some embodiments, when both the 2-step RA configuration and the 4-step RA configuration are broadcasted in system information (e.g., system information block type 1 (SIB1)), a RA type selection is performed, for example, between a 2-step random access procedure (2-step RACH) and a 4-step random access procedure (4-step RACH). For example, the RA type selection can be performed for Step 1 of the 2-step random access procedure, in some embodiments.

In some embodiments, the following alternatives or options can be considered or implemented in RA type selection between 2-step RACH and 4-step RACH. These alternatives or options can be performed separately or in combination. In brief overview, a "RACH type selection factor" based solution can be considered or implemented in a first alternative (ALT 1), a "RACH type selection timer" based solution can be considered or implemented in a second alternative (ALT 2), and a backoff indicator based solution can be considered or implemented in a third alternative (ALT 3), as described in more detail herein below.

ALT 1: "RACH Type Selection Factor" Based Solution

In some embodiments, with (or upon, responsive to, after, when) the RACH type selection factor being configured (described in more detail below), a UE (e.g., UE 404) can draw, obtain, or determine a random number or a randomly generated number "rand", for example, in the range of 0≤rand<1. In other embodiments, the "rand" can be in other ranges. The "rand" can be randomly generated by the UE or another device, in some embodiments. In some embodiments, the UE can compare the "rand" with a value indicated by the RACH type selection factor. If the "rand" is lower (or lower+equal, or larger, or larger+equal) than the value indicated by the RACH type selection factor, the UE is allowed to select the 2-step RACH. Otherwise, the UE selects the 4-step RACH.

In some embodiments, with (or upon, responsive to, after, when) the RACH type selection factor being configured, the UE can draw, obtain, or determine a random number or a randomly generated number "rand", for example, in the range of 0≤rand<1. In other embodiments, the "rand" can be in other ranges. The "rand" can be randomly generated by the UE or another device, in some embodiments. In some embodiments, the UE can compare the "rand" with a value indicated by the RACH type selection factor. If the "rand" is lower (or lower+equal, or larger, or larger+equal) than the value indicated by the RACH type selection factor, the UE shall select the 2-step RACH. Otherwise, the UE shall select the 4-step RACH.

In some embodiments, besides the factor based solution, some other criteria may also be considered in the RA type selection (e.g., RSRP threshold, and 2-step RACH can only be selected in case the RSRP measured is larger than the RSRP threshold). Therefore, the factor based RA type selection can be used in the following two ways: Alt1: The factor based solution is used to determine whether the 2-step RACH is allowed; and Alt2: The factor based solution is used to determine whether the 2-step RACH shall be selected. In Alt1, the factor based solution can be used together with other criteria, and 2-step RACH can only be selected in case the selection of 2-step RACH is allowed by all the criteria. In Alt 2, the factor based solution shall be used in case the 2-step RACH is allowed, which can be determined by other criteria.

In some embodiments, the following alternatives or options can be considered or implemented for the configuration of the RACH type selection factor.

In alternative 1 of the configuration of the RACH type selection factor, the RACH type selection factor can be configured per access category. With (based on, using) the per access category configured "RACH type selection factor," the UE can determine the access category first and then use the corresponding "RACH type selection factor" to determine which random access procedure (e.g., 2-step random access procedure or 4-step random access procedure) is to be selected.

In alternative 2 of the configuration of the RACH type selection factor, the RACH type selection factor can be configured per unified access control (UAC)-BarringInfoSet. With (based on, using) the per UAC-BarringInfoSet configured "RACH type selection factor," the UE can determine the UAC-BarringInfoSet first and then use the corresponding "RACH type selection factor" to determine which random access procedure (e.g., 2-step random access procedure or 4-step random access procedure) is to be selected.

In alternative 3 of the configuration of the RACH type selection factor, the RACH type selection factor can be configured per access identity. With (based on, using) the per access identity configured "RACH type selection factor," the UE can determine the access identity first and then use the corresponding "RACH type selection factor" to determine which random access procedure (e.g., 2-step random access procedure or 4-step random access procedure) is to be selected.

In alternative 4 of the configuration of the RACH type selection factor, the RACH type selection factor can be configured per public land mobile network (PLMN). With (based on, using) the per PLMN configured "RACH type selection factor," the UE can determine the PLMN first and then use the corresponding "RACH type selection factor" to determine which random access procedure (e.g., 2-step random access procedure or 4-step random access procedure) is to be selected.

In alternative 5 of the configuration of the RACH type selection factor, the RACH type selection factor can be configured for different triggers or trigger events of the RACH procedure. In some embodiments, the following triggers or trigger events of the RACH procedure can be considered or implemented: (a) Initial access from radio resource control (RRC) IDLE; (b) RRC connection re-establishment procedure; (c) Handover; (d) Downlink (DL) or Uplink (UL) data arrival during RRC CONNECTED when the UL synchronization status is "non-synchronized"; (e) UL data arrival during RRC CONNECTED when there are no physical uplink control channel (PUCCH) resources for Scheduling Request (SR) available; (f) SR failure; (g) Request by RRC upon synchronous reconfiguration; (h) Transition from RRC INACTIVE; (i) Establishing (or to establish) time alignment at secondary cell (SCell) addition; (j) Request for other system information (which may be sometimes referred to as remaining and other system information in the NR mobile networks) or system information message (SI); (k) Beam failure recovery. In some embodiments, with (based on, using) the trigger-specific configured "RACH type selection factor," the UE can determine the trigger first and then use the corresponding "RACH type selection factor" to determine which random access procedure (e.g., 2-step random access procedure or 4-step random access procedure) is to be selected.

In alternative 6 of the configuration of the RACH type selection factor, the RACH type selection factor can be configured for services with different Quality of Service (QoS) requirements, or for different logical channel, or for different logical channel group. For each type of service with different QoS requirement, logical channel, or logical channel group, a "RACH type selection factor" can be configured. Then, according to (based on, using) the QoS requirement, logical channel, or logical channel group from which there is data for transmission, the UE uses the corresponding "RACH type selection factor" to determine which random access procedure (e.g., 2-step random access procedure or 4-step random access procedure) is to be selected.

In alternative 7 of the configuration of the RACH type selection factor, the RACH type selection factor can be configured per cell. With (based on, using) the per cell configured "RACH type selection factor," the UE can determine the cell first and then use the corresponding "RACH type selection factor" to determine which random access procedure (e.g., 2-step random access procedure or 4-step random access procedure) is to be selected.

In alternative 8 of the configuration of the RACH type selection factor, the RACH type selection factor can be configured per bandwidth part (BWP). With (based on, using) the per BWP configured "RACH type selection factor," the UE can determine the BWP first and then use the corresponding "RACH type selection factor" to determine which random access procedure (e.g., 2-step random access procedure or 4-step random access procedure) is to be selected.

In some embodiments, a combination of the above alternatives for configuring the RACH type selection factor can be considered or implemented. For example, for each cell or BWP, different RACH type selection factor(s) can be configured for different access category, access identifier, UAC-BarringInfoSet, trigger, or service type, etc.

In some embodiments, with respect to the above alternatives for configuring the RACH type selection factor, in the event that the "RACH type selection factor" is missing for the corresponding access category/access identifier/UAC-BarringInfoSet/trigger/cell/BWP/QoS requirement/logical channel/logical channel group, the following additional alternatives may be considered or used: (a) additional alternative 1, where the UE uses the 4-step random access procedure; (b) additional alternative 2, where a default value (e.g., configured by the network or BS, or fixed/specified in the specification) is used for the "RACH type selection factor"; (c) additional alternative 3, where the UE uses the 2-step random access procedure.

Figure 5:
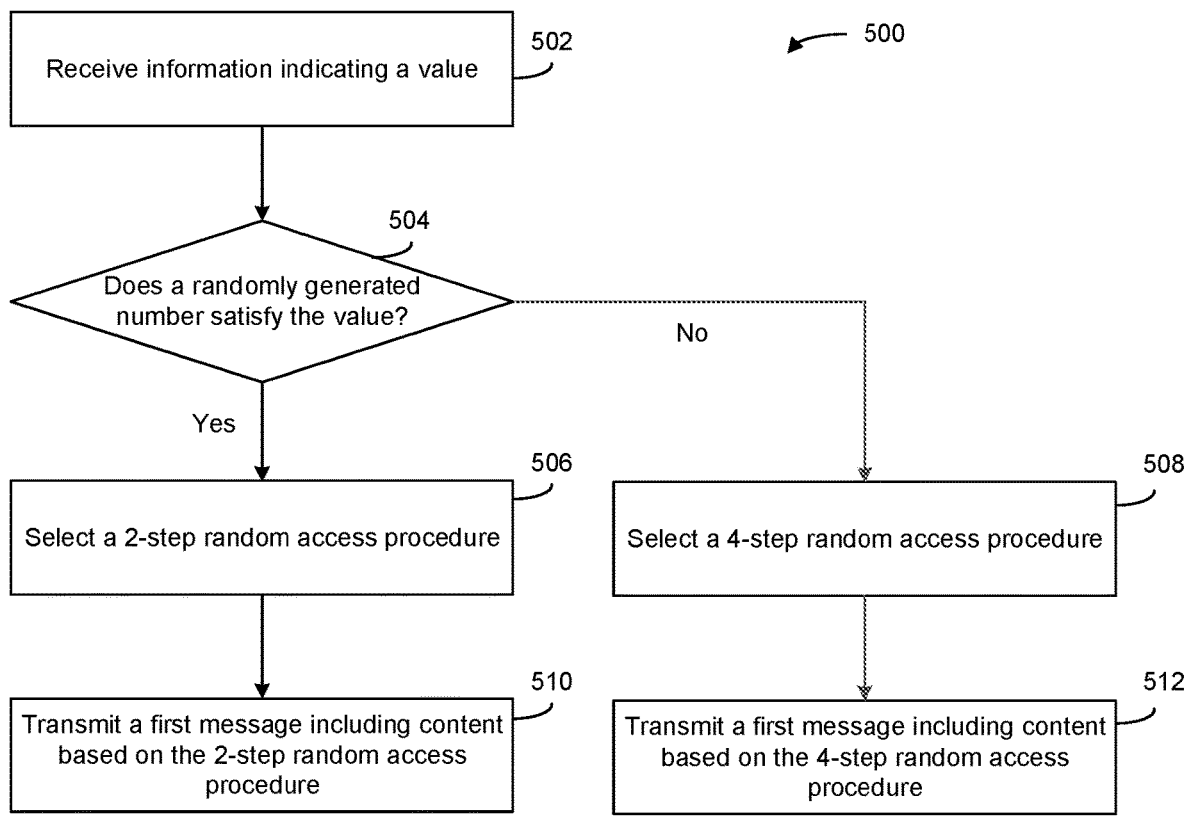
FIG. 5 is a flow diagram illustrating an example process for enhanced random access procedure using the RACH type selection factor, in accordance with some embodiments of the present disclosure.

FIG. 5 is a flow diagram illustrating an example process 500 for enhanced random access procedure using the RACH type selection factor, in accordance with some embodiments of the present disclosure. In some embodiments, the process 500 can be performed by a wireless communication device (e.g., UE 404). At operation 502, the wireless communication device receives information indicating a value from a wireless communication node (e.g., BS 402). In some embodiments, the information can be broadcasted in system information, or by RRC signaling. In some embodiments, the value can correspond to or associated with a RACH type selection factor. In some embodiments, the value can be configured by the wireless communication node. For example, the value can be configured using the alternatives for configuring the RACH type selection factor, as described herein above.

In some embodiments, the value indicated by the information received at operation 502 can be configured based on an access category. In some embodiments, the value can be configured based on a UAC-BarringInfoSet. In some embodiments, the value can be configured based on an access identity. In some embodiments, the value can be configured based on a PLMN. In some embodiments, the value can be configured based on one or more triggers or trigger events of the 4-step random access procedure or the 2-step random access procedure to access to the wireless communication node. In some embodiments, the value can be configured based on a QoS requirement. In some embodiments, the plurality of values can respectively be configured based on a plurality of logical channels or logical channel groups. In some embodiments, the value can be configured based on a cell that the wireless communication device is in. In some embodiments, the value can be configured based on a BWP.

Referring again to FIG. 5, at operation 504, the wireless communication device can compare a randomly generated value with the value received from the wireless communication node to determine whether the randomly generated value satisfies the value. In some embodiments, the wireless communication device can generate a random number as the randomly generated value. In other embodiments, the randomly generated value can be generated by another device and transmitted to the wireless communication device. In some embodiments, the randomly generated value can be in the range of greater than or equal to 0, and less than 1 (0≤randomly generated value<1). In other embodiments, the randomly generated value can be in other ranges.

In some embodiments, responsive to determining that the randomly generated value satisfies the value (e.g., the randomly generated value is less than, or less than or equal to, or greater than, or greater than or equal to the value) at operation 504, the process 500 proceeds to operation 506. Otherwise, the process 500 proceeds to operation 508.

At operation 506, the wireless communication device selects the 2-step random access procedure to access to the wireless communication node. At operation 508, the wireless communication device selects the 4-step random access procedure to access to the wireless communication node. If the 2-step random access procedure is selected at operation 506, the process 500 may proceed to operation 510. If the 4-step random access procedure is selected at operation 508, the process 500 may proceed to operation 512.

At operation 510, the wireless communication device transmits a first message to access to the wireless communication node. The content of the first message being transmitted at operation 510 can be based on the selection of the 2-step random access procedure. In some embodiments, the content of the first message may include a random access preamble and a payload when (responsive to) the 2-step random access procedure is selected. In some embodiments, the payload may be optional. In some embodiments, the preamble may be optional.

At operation 512, the wireless communication device transmits a first message to access to the wireless communication node. The content of the first message being transmitted at operation 512 can be based on the selection of the 4-step random access procedure. In some embodiments, the content of the first message may include a random access preamble when (responsive to) the 4-step random access procedure is selected.

In some embodiments, a wireless communication node (e.g., BS 402) can transmit, to a wireless communication device (e.g., UE 404), information indicating a value. In some embodiments, the value can correspond to or associated with a RACH type selection factor. In some embodiments, the value can be configured by the wireless communication node. For example, the value can be configured using the alternatives for configuring the RACH type selection factor, as described herein above. In some embodiments, the wireless communication node can receive, from the wireless communication device, a first message to access to the wireless communication node. In some embodiments, the first message can include a random access preamble when the 4-step random access procedure is selected (e.g., by the wireless communication device). In some embodiments, the first message can include a random access preamble and a payload when the 2-step random access procedure is selected (e.g., by the wireless communication device). In some embodiments, the payload may be optional. In some embodiments, the preamble may be optional. In some embodiments, the wireless communication node can transmit a second message in response to the first message.

Figure 6:
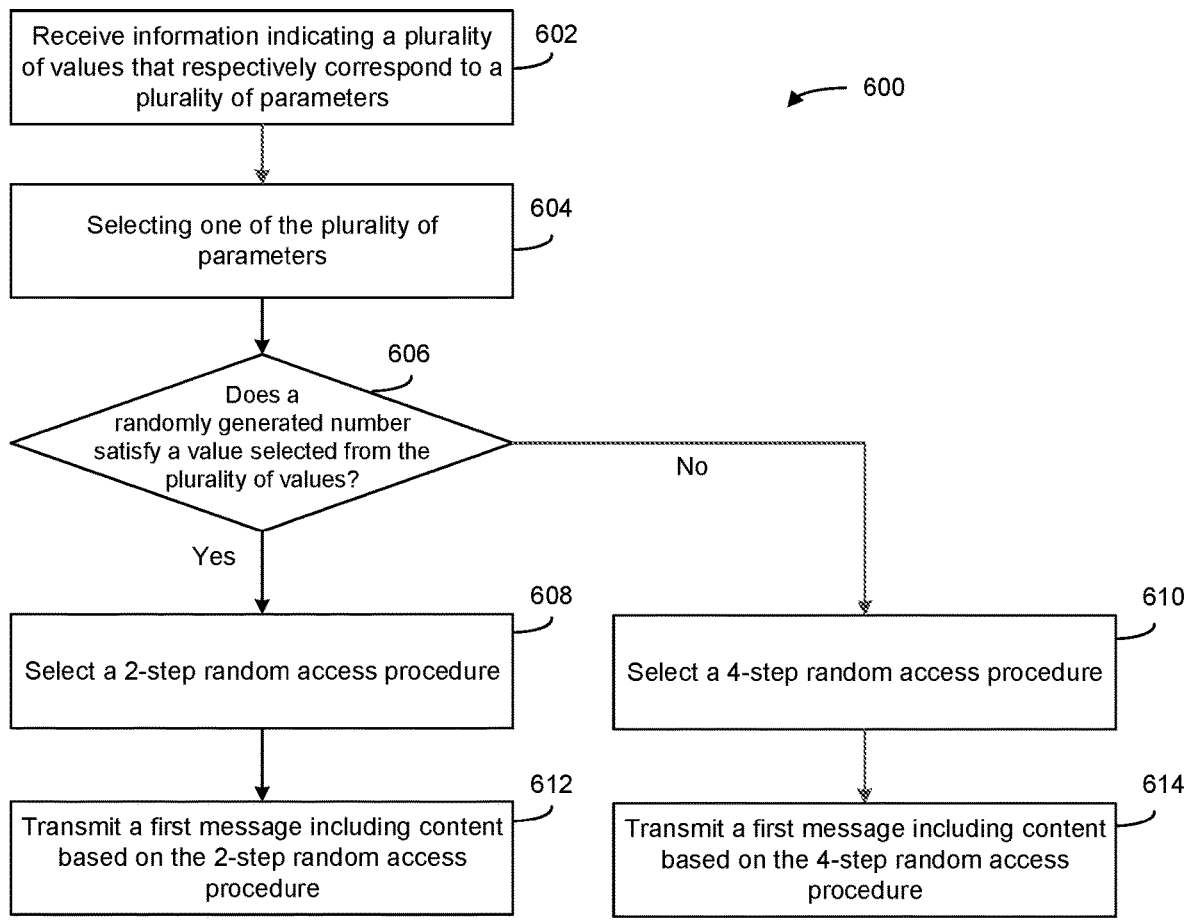
FIG. 6 is a flow diagram illustrating another example process for enhanced random access procedure using the RACH type selection factor, in accordance with some embodiments of the present disclosure.

FIG. 6 is a flow diagram illustrating an example process 600 for enhanced random access procedure using the RACH type selection factor, in accordance with some embodiments of the present disclosure. In some embodiments, the process 600 can be performed by a wireless communication device (e.g., UE 404). At operation 602, the wireless communication device receives information indicating a plurality of values from a wireless communication node (e.g., BS 402). In some embodiments, the information can be broadcasted in system information, or by RRC signaling. In some embodiments, the plurality of values respectively correspond to a plurality of parameters. In some embodiments, the plurality of parameters can be a plurality of access control parameters, such as a plurality of access categories, a plurality of UAC-BarringInfoSets, or a plurality of access identities. In some embodiments, the plurality of parameters can be a plurality of non-access control parameters, such as a plurality of PLMNs, a plurality of triggers or trigger events of the random access procedure, a plurality of QoS requirements, a plurality of logical channels or logical channel groups, a plurality of cell IDs, or a plurality of BWPs. In some embodiments, the plurality of values can be configured by the wireless communication node. For example, the plurality of values can be configured using the alternatives for configuring the RACH type selection factor, as described herein above.

In some embodiments, the plurality of values received at operation 602 can respectively be configured based on a plurality of access categories. In some embodiments, the plurality of values can respectively be configured based on a plurality of UAC-BarringInfoSets. In some embodiments, the plurality of values can respectively be configured based on a plurality of access identities. In some embodiments, the plurality of values can respectively be configured based on a plurality of PLMNs. In some embodiments, the plurality of values can respectively be configured based on a plurality of triggers or trigger events of the 4-step random access procedure or the 2-step random access procedure to access to the wireless communication node. In some embodiments, the plurality of values can respectively be configured based on a plurality of QoS requirements. In some embodiments, the plurality of values can respectively be configured based on a plurality of logical channels or logical channel groups. In some embodiments, the plurality of values can respectively be configured based on a plurality of cells. In some embodiments, the plurality of values can respectively be configured based on a plurality of BWPs.

As an example, when the plurality of parameters are a plurality of access categories (i.e., when the "RACH type selection factor" is per access category), the wireless communication node can configure a factor 1 for access category 1, a factor 2 for access category 2, and a factor 3 for access category 3, and so on. Continuing with this example, the wireless communication device can then determine or decide the access category, generate a randomly generated value, and compare the randomly generated value with the corresponding factor. For instance, if the access category is category 2, the factor to be compared against is factor 2.

Referring again to FIG. 6, at operation 604, the wireless communication device selects one parameter from the plurality of parameters. Continuing with the above example, when the plurality of parameters are a plurality of access categories, the wireless communication device can select one category from the plurality of access categories. At operation 606, the wireless communication device can compare a randomly generated value with a value selected from the plurality of values to determine whether the randomly generated value satisfies the value. In some embodiments, the value is selected or determined from the plurality of values according to the selected parameter at operation 604. In some embodiments, the wireless communication device can generate a random number as the randomly generated value. In other embodiments, the randomly generated value can be generated by another device and transmitted to the wireless communication device. In some embodiments, the randomly generated value can be in the range of greater than or equal to 0, and less than 1 (0≤randomly generated value<1). In other embodiments, the randomly generated value can be in other ranges.

In some embodiments, responsive to determining that the randomly generated value satisfies the value selected from the plurality of values (e.g., the randomly generated value is less than, or less than or equal to, or greater than, or greater than or equal to the value) at operation 606, the process 600 proceeds to operation 608. Otherwise, the process 600 proceeds to operation 610.

At operation 608, the wireless communication device selects the 2-step random access procedure to access to the wireless communication node. At operation 610, the wireless communication device selects the 4-step random access procedure to access to the wireless communication node. If the 2-step random access procedure is selected at operation 608, the process 600 may proceed to operation 612. If the 4-step random access procedure is selected at operation 610, the process 500 may proceed to operation 614.

At operation 612, the wireless communication device transmits a first message to access to the wireless communication node. The content of the first message being transmitted at operation 612 can be based on the selection of the 2-step random access procedure. In some embodiments, the content of the first message may include a random access preamble and a payload when (responsive to) the 2-step random access procedure is selected. In some embodiments, the payload may be optional. In some embodiments, the preamble may be optional.

At operation 614, the wireless communication device transmits a first message to access to the wireless communication node. The content of the first message being transmitted at operation 614 can be based on the selection of the 4-step random access procedure. In some embodiments, the content of the first message may include a random access preamble when (responsive to) the 4-step random access procedure is selected.

In some embodiments, a wireless communication node (e.g., BS 402) can transmit, to a wireless communication device (e.g., UE 404), information indicating a plurality of values. In some embodiments, the plurality of values can respectively correspond to a plurality of parameters. In some embodiments, the plurality of values respectively correspond to a plurality of parameters. In some embodiments, the plurality of parameters can be a plurality of access control parameters, such as a plurality of access categories, a plurality of UAC-BarringInfoSets, or a plurality of access identities. In some embodiments, the plurality of parameters can be a plurality of non-access control parameters, such as a plurality of PLMNs, a plurality of triggers or trigger events of the random access procedure, a plurality of QoS requirements, a plurality of logical channels, a plurality of logical channel groups, a plurality of cell IDs, or a plurality of BWPs. In some embodiments, the plurality of values can be configured by the wireless communication node. For example, the plurality of values can be configured using the alternatives for configuring the RACH type selection factor, as described herein above.

In some embodiments, the wireless communication node can receive, from the wireless communication device, a first message to access to the wireless communication node. In some embodiments, the first message can include a random access preamble when the 4-step random access procedure is selected (e.g., by the wireless communication device). In some embodiments, the first message can include a random access preamble and a payload when the 2-step random access procedure is selected (e.g., by the wireless communication device). In some embodiments, the payload may be optional. In some embodiments, the preamble may be optional. In some embodiments, the wireless communication node can transmit a second message in response to the first message.

ALT 2: "RACH Type Selection Timer" Based Solution

In some embodiments, a "RACH type selection timer" based solution can be considered or implemented for RACH type selection. In some embodiments, during the running of each timer, a corresponding UE (e.g., UE 404) is not allowed to initiate a 2-step random access procedure regardless of whether the condition for the selection of the 2-step random access procedure is met if configured. On the other hand, when the timer expires or is stopped, the UE is allow to select a 2-step random access procedure or a 4-step random access procedure, or perform the RACH type selection if other threshold(s) for type selection is configured.

In some embodiments, during the running of each timer, a corresponding UE (e.g., UE 404) is only allowed to initiate a 2-step random access procedure or is allowed to initiate a 2-step RACH provided that the condition for the selection of the 2-step random access procedure is met if configured. On the other hand, when the timer expires or is stopped, the UE can only perform the 4-step RACH.

In some embodiments, one or multiple times can be configured, with the same or different length. In some embodiments, the length of the timer can be configured using the following alternatives or options. In a first alternative, the timer can be directly configured by a network or a BS, and can be broadcasted in system information or signaled by a Radio Resource Control (RRC) signaling. In a second alternative, a default length of timer can be configured or predefined (predetermined), and scaling factors can be used for configuring of the length of the timer. When the scaling factor is missing, the default length is used.

In some embodiments, with respect to the start of the timer, a "RACH type selection timer enable indicator" can be used to control the timer configured. In some embodiments, the "RACH type selection timer enable indicator" can be one bit if a unified timer is configured, or a bit string if multiple timers are configured. In some embodiments, a "RACH type selection timer enable indicator" having a value "1" means the timer is started, and "0" means the timer is stopped. In other embodiments, difficult values or formats of the "RACH type selection timer enable indicator" can be used. In some embodiments, the "RACH type selection timer enable indicator" can be delivered or transmitted to the UE by system information or a RRC signaling, or included in a RA response or Msg 2. In some embodiments, the UE can receive the "RACH type selection timer enable indicator" which can activate the timer. In some embodiments the timer can be started upon (or after a certain duration of) the first transmission of Msg1 of 2-step RACH, or upon (or after a certain duration of) the first transmission of Msg1 of 4-step RACH.

In some embodiments, the configuration of the timer can be broadcasted in system information or signaled by a RRC signaling. In some embodiments, the following alternatives or options can be considered or implemented for the configuration of the RACH type selection timer.

In alternative 1 of the configuration of the RACH type selection timer, the timer can be configured per access category. With (based on, using) the per access category configured timer, the UE can determine the access category first and then use the corresponding RACH type selection timer to determine which random access procedure (e.g., 2-step random access procedure or 4-step random access procedure) is to be selected.

In alternative 2 of the configuration of the RACH type selection timer, the timer can be configured per UAC-BarringInfoSet. With (based on, using) the per UAC-BarringInfoSet configured timer, the UE can determine the UAC-BarringInfoSet first and then use the corresponding RACH type selection timer to determine which random access procedure (e.g., 2-step random access procedure or 4-step random access procedure) is to be selected.

In alternative 3 of the configuration of the RACH type selection timer, the timer can be configured per access identity. With (based on, using) the per access identity configured timer, the UE can determine the access identity first and then use the corresponding RACH type selection timer to determine which random access procedure (e.g., 2-step random access procedure or 4-step random access procedure) is to be selected.

In alternative 4 of the configuration of the RACH type selection timer, the timer can be configured per PLMN. With (based on, using) the per PLMN configured timer, the UE can determine the PLMN first and then use the corresponding RACH type selection timer to determine which random access procedure (e.g., 2-step random access procedure or 4-step random access procedure) is to be selected.

In alternative 5 of the configuration of the RACH type selection time, the timer can be configured for different triggers or trigger events of the RACH procedure. In some embodiments, the following triggers or trigger events of the RACH procedure can be considered or implemented: (a) Initial access from RRC IDLE; (b) RRC connection re-establishment procedure; (c) Handover; (d) Downlink (DL) or Uplink (UL) data arrival during RRC CONNECTED when the UL synchronization status is "non-synchronized"; (e) UL data arrival during RRC CONNECTED when there are no PUCCH resources for Scheduling Request (SR) available; (f) SR failure; (g) Request by RRC upon synchronous reconfiguration; (h) Transition from RRC INACTIVE; (i) Establishing (or to establish) time alignment at SCell addition; (j) Request for other system information (which may be sometimes referred to as remaining and other system information in the NR mobile networks) or system information message (SI); (k) Beam failure recovery. In some embodiments, with (based on, using) the trigger-specific configured timer, the UE can determine the trigger first and then use the corresponding timer to determine which random access procedure (e.g., 2-step random access procedure or 4-step random access procedure) is to be selected.

For example, if timers for different trigger events are configured, and the "RACH type selection timer enable indicator" is set to "11111111110" and broadcasted in system information, then the "RACH type selection timer" configured for trigger events other than the beam failure recovery (BFR) can be running. During the running of each timer, the RACH triggered by the corresponding events can only follow the 4-step random access procedure, except for BFR triggered RACH where the UE can select the 2-step random access procedure or the 4-step random access procedure according to certain threshold(s) if configured.

In alternative 6 of the configuration of the RACH type selection timer, the timer can be configured for services with different QoS requirements, or different logical channels or different logical channel groups. For each type of service with different QoS requirement/logical channels/logical channel groups, a timer can be configured. Then, according to (based on, using) the QoS requirement/logical channels/logical channel groups, the UE uses the corresponding "RACH type selection timer" to determine which random access procedure (e.g., 2-step random access procedure or 4-step random access procedure) is to be selected.

In alternative 7 of the configuration of the RACH type selection timer, the timer can be configured per cell. With (based on, using) the per cell configured timer, the UE can determine the cell first and then use the corresponding "RACH type selection timer" to determine which random access procedure (e.g., 2-step random access procedure or 4-step random access procedure) is to be selected.

In alternative 8 of the configuration of the RACH type selection timer, the RACH type selection factor can be configured per BWP. With (based on, using) the per BWP configured timer, the UE can determine the BWP first and then use the corresponding "RACH type selection timer" to determine which random access procedure (e.g., 2-step random access procedure or 4-step random access procedure) is to be selected.

In some embodiments, a combination of the above alternatives for configuring the RACH type selection timer can be considered or implemented. For example, for each cell or BWP, different RACH type selection timer(s) can be configured for different access category, access identifier, UAC-BarringInfoSet, trigger, or service type, etc. In some embodiments, if the configuration of the timer is absent, the UE can select the RACH type according to other configured or predefined criterion, if configured.

Figure 7:
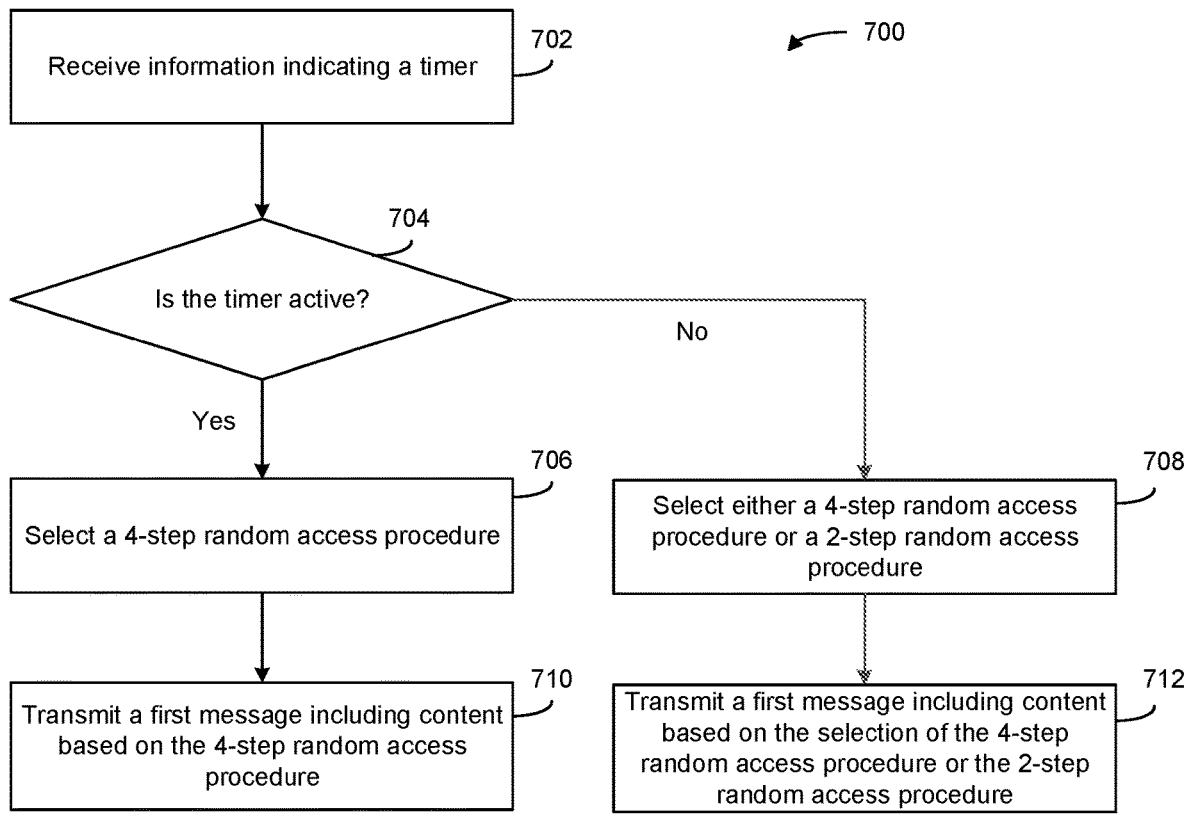
FIG. 7 is a flow diagram illustrating an example process for enhanced random access procedure using the RACH type selection timer, in accordance with some embodiments of the present disclosure.

FIG. 7 is a flow diagram illustrating an example process 700 for enhanced random access procedure using the RACH type selection timer, in accordance with some embodiments of the present disclosure. In some embodiments, the process 700 can be performed by a wireless communication device (e.g., UE 404). At operation 702, the wireless communication device receives information indicating a timer from a wireless communication node (e.g., BS 402). In some embodiments, the information can be broadcasted in system information, or by RRC signaling. In some embodiments, the timer can be or correspond to a RACH type selection timer. In some embodiments, the timer can be configured by the wireless communication node. For example, the timer can be configured using the alternatives for configuring the RACH type selection timer, as described herein above.

In some embodiments, the timer (e.g., a duration of the timer) indicated by the information received at operation 702 can be configured based on an access category. In some embodiments, the timer (e.g., a duration of the timer) can be configured based on a UAC-BarringInfoSet. In some embodiments, the timer (e.g., a duration of the timer) can be configured based on an access identity. In some embodiments, the timer (e.g., a duration of the timer) can be configured based on a PLMN. In some embodiments, the timer (e.g., a duration of the timer) can be configured based on one or more triggers or trigger events of the 4-step random access procedure or the 2-step random access procedure to access to the wireless communication node. In some embodiments, the timer (e.g., a duration of the timer) can be configured based on a QoS requirement/logical channels/logical channel groups. In some embodiments, the timer (e.g., a duration of the timer) can be configured based on a cell that the wireless communication device is in. In some embodiments, the timer (e.g., a duration of the timer) can be configured based on a BWP.

In some embodiments, a duration of the timer can be configured by a communication network or a BS, and broadcasted in system information. In some embodiments, a duration of the timer can be configured by a communication network or a BS, and signaled by a Radio Resource Control (RRC) signaling. In some embodiments, a duration of the timer can be configured based on a scaling factor, and in the event that the scaling factor is missing, a default duration can be used.

In some embodiments, the wireless communication device can receive an enable indicator (e.g., a RACH type selection timer enable indicator) which can activate or start the timer. In some embodiments, the enable indicator can be transmitted from the wireless communication node.

Referring again to FIG. 7, at operation 704, the wireless communication device can determine whether the timer in active. In some embodiments, the timer is active when the timer is running, and the timer is inactive when the timer expires or is stopped. In some embodiments, responsive to determining that the timer is active at operation 704, the process 700 proceeds to operation 706, and responsive to determining that the timer is inactive at operation 704, the process 700 proceeds to operation 708.

At operation 706, the wireless communication device selects a 4-step random access procedure to access to the wireless communication node responsive to determining that the timer is active. At operation 708, the wireless communication device selects either the 4-step random access procedure or a 2-step random access procedure to access to the wireless communication node responsive to determining that the timer is inactive. If the 4-step random access procedure is selected at operation 706, the process 700 may proceed to operation 710. If either the 4-step random access procedure or the 2-step random access procedure is selected at operation 708, the process 700 may proceed to operation 712.

At operation 710, the wireless communication device transmits a first message to access to the wireless communication node. The content of the first message being transmitted at operation 710 can be based on the selection of the 4-step random access procedure. In some embodiments, the content of the first message may include a random access preamble when (responsive to) the 4-step random access procedure is selected.

At operation 712, the wireless communication device transmits a first message to access to the wireless communication node. The content of the first message being transmitted at operation 712 can be based on the selection of the 4-step random access procedure or the 2-step random access procedure at operation 708. In some embodiments, the content of the first message may include a random access preamble when (responsive to) the 4-step random access procedure is selected at operation 708. In some embodiments, the content of the first message may include a random access preamble and a payload when (responsive to) the 2-step random access procedure is selected at operation 708.

In some embodiments, the payload may be optional. In some embodiments, the preamble may be optional.

In some embodiments, a wireless communication node (e.g., BS 402) can transmit, to a wireless communication device (e.g., UE 404), information indicating a timer. In some embodiments, the timer can be or correspond to a RACH type selection timer. In some embodiments, the timer can be configured by the wireless communication node. For example, the value can be configured using the alternatives for configuring the RACH type selection timer, as described herein above. In some embodiments, the wireless communication node can receive, from the wireless communication device, a first message to access to the wireless communication node. In some embodiments, the first message can include a random access preamble when the 4-step random access procedure is selected (e.g., by the wireless communication device). In some embodiments, the first message can include a random access preamble and a payload when the 2-step random access procedure is selected (e.g., by the wireless communication device). In some embodiments, the payload may be optional. In some embodiments, the preamble may be optional. In some embodiments, the wireless communication node can transmit a second message in response to the first message.

ALT 3: "Backoff Indicator" Based Solution

In some embodiments, a Backoff indication can be included in a Msg2 (e.g., the Msg2 in a 2-step random access procedure or a 4-step random access procedure). When a UE receives a backoff indication, the UE can determine the backoff time according to the backoff indication. During the running of backoff time, the UE is not allowed to retry the correspondent random access procedure or RACH.

In some embodiments, a backoff indication can be configured according to the following alternatives: (a) in a first alternative, one backoff indication can be configured for both RACH types (e.g., the 2-step random access procedure and the 4-step random access procedure); (b) in a second alternative, one backoff indication is configured for either the 2-step random access procedure or the 4-step random access procedure; (c) in a third alternative, separate backoff indications can be configured for the 2-step random access procedure and 4-step random access procedure, respectively, and can be included in a Msg2. For example, during the backoff time for the 2-step random access procedure and the 4-step random access procedure, the UE cannot initiate random access procedure. However, if the backoff time for the 2-step random access procedure is running, and the backoff time for 4-step random access procedure is not running, the UE can only initiate 4-step random access procedure. Similarly, if the backoff time for the 4-step random access procedure is running, and the backoff time for 2-step random access procedure is not running, the UE can only initiate 2-step random access procedure.

In some embodiments, a combination of above alternatives can be considered or implemented. For example, different "RACH type selection factors" can be configured for different trigger events. On top of that, separated backoff times can be configured for the 2-step random access procedure and the 4-Step random access procedure. An example is provided below, with the assumption that the backoff time for the 2-step random access procedure is longer than the backoff time for 4-step random access procedure.

At Step 1 of the Example, the UE determines the RACH type selection factor based on triggering events. The UE then selects the RACH type by comparing a randomly generated number against the RACH type selection factor.

At Step 2 of the Example, the UE selects the RACH resource and transmits a Msg1 on the selected RACH resource.

At Step 3 of the Example, the UE receives a Msg2 which includes separated backoff indications for 2-step random access procedure and 4-step random access procedure.

At Step 4 of the Example, after or when the backoff time for the 4-step random access procedure expires or stops, while the backoff time for 2-step random access procedure is still running, the UE re-attempts the 4-step random access procedure. If the UE still has not gained access to the BS after the backoff time for the 2-step random access procedure expires or stops, then UE re-attempts RACH by going back to step 1.

Figure 8:
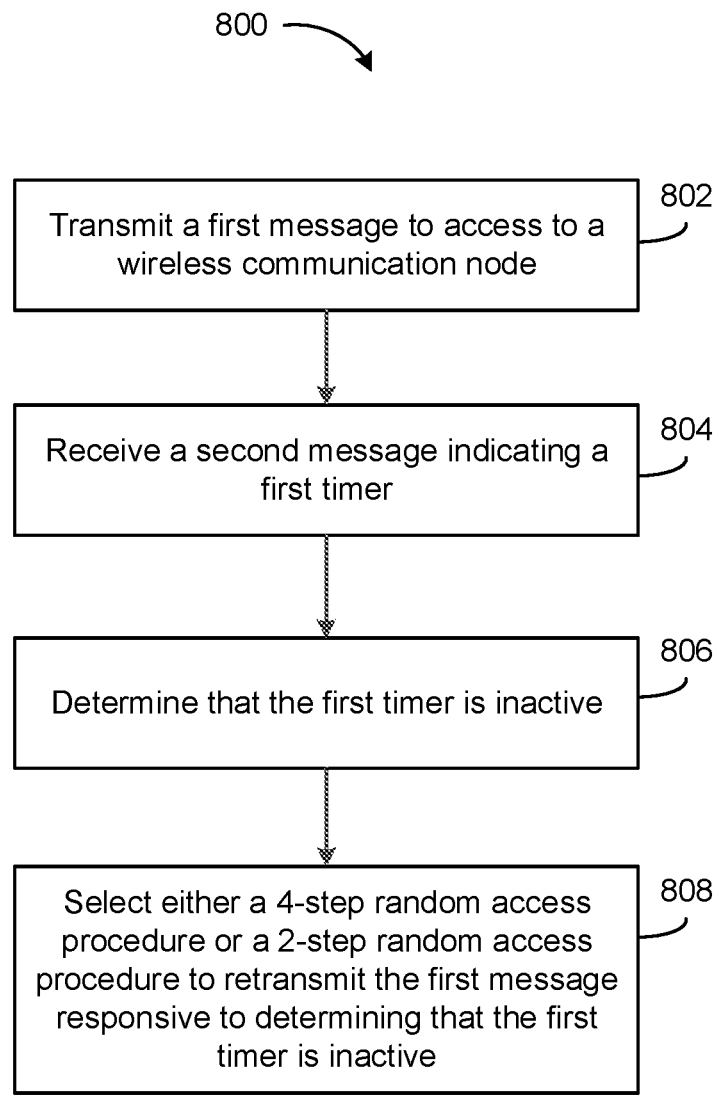
FIG. 8 is a flow diagram illustrating an example process for enhanced random access procedure with the backoff indication, in accordance with some embodiments of the present disclosure.

FIG. 8 is a flow diagram illustrating an example process 800 for enhanced random access procedure with the backoff indication, in accordance with some embodiments of the present disclosure. In some embodiments, the process 800 can be performed by a wireless communication device (e.g., UE 404). At operation 802, the wireless communication device transmits a first message to access to a wireless communication node (BS 402). In some embodiments, the content of the first message can be based on a selection of a 4-step random access procedure or a 2-step random access procedure. In some embodiments, the selection of the 4-step random access procedure or the 2-step random access procedure can be the performed using the "RACH type selection factor" or the "RACH type selection timer" processes as described herein above. In some embodiments, the content of the first message can include a random access preamble when the 4-step random access procedure is selected. The content of the first message can include the random access preamble and a payload when the 2-step random access procedure is selected. In some embodiments, the payload may be optional. In some embodiments, the preamble may be optional.

At operation 804, the wireless communication device receives, from the wireless communication node, in response to transmitting the first message, a second message indicating a first timer. In some embodiments, the first time can be a backoff timer or indication, for example, as described herein above.

At operation 806, the wireless communication device determines that first timer is inactive. In some embodiments, the wireless communication device can determines whether the first timer is active (e.g., running). If the first timer is active or running, the wireless communication device is not allowed to retry the random access procedure or RACH. In such a case, the wireless communication device may wait until the first timer expires or stops. On the other hand, if first timer is inactive (e.g., not running, stops, or expires after running for the duration of the timer), the wireless communication device can retry the random access procedure.

At operation 808, responsive to determining that the first timer is inactive at operation 806, the wireless communication device selects either the 4-step random access procedure or the 2-step random access procedure to retransmit the first message. In some embodiments, the first timer can be configured for both the 4-step random access procedure and the 2-step random access procedure. In such a case, the wireless communication device can either retransmit the first message at operation 808 using the same random access procedure used at operation 802, or select one of the 4-step random access procedure or the 2-step random access procedure according to the "RACH type selection factor" or the "RACH type selection timer" processes as described herein above.

In some embodiments, the first timer can be configured for one of the 4-step random access procedure or the 2-step random access procedure. In such a case, the wireless communication device can retransmit the first message based on the random access procedure (i.e., either the 4-step random access procedure or the 2-step random access procedure) associated with the first timer.

In some embodiments, the first timer can include a first value and a second value. For example, the first value can be configured for the 4-step random access procedure, and the second value can be configured for the 2-step random access procedure. In such a case, the wireless communication device can retransmit the first message using the random access procedure associated with the value indicating an inactive timer. If both the first value and the second value indicate inactive timers, the wireless communication device can either retransmit the first message at operation 808 using the same random access procedure used at operation 802, or select one of the 4-step random access procedure or the 2-step random access procedure according to the "RACH type selection factor" or the "RACH type selection timer" processes as described herein above.

In some embodiments, a wireless communication node (e.g., BS 402) can receive, from a wireless communication device (e.g., UE 404), a first message. In some embodiments, the content of the first message can be based on a selection of a 4-step random access procedure or a 2-step random access procedure. In some embodiments, the wireless communication node can transmit, to the wireless communication device in response to receiving the first message, a second message indicating a first timer. For example, the first timer can be a backoff time or indication. In some embodiments, the wireless communication node can receive the first message transmitted from the wireless communication device.

D. Content in Msg1 of the 2-Step RACH

In some embodiments, at least one of the following information can be included in the payload of Msg1 in the 2-step random access procedure to implicitly or explicitly indicate the time-domain resource on which the corresponding preamble is transmitted. For example, the information can include: (a) System Frame Number (SFN) index or the Least Significant Bit (LSB) of the SFN index and slot index; (b) Absolute timing which can contain at least the Coordinated Universal Time corresponding to the SFN boundary at or immediately after the ending boundary of the slot in which preamble is transmitted; (c) SFN mod N, where SFN is the index of the radio frame in which the preamble is transmitted, and N is the periodicity of consecutive RACH occasions (ROs); and (d) Random access radio network temporary identifier (RA-RNTI) value that is determined by the RO in which the preamble is transmitted.

E. Transmission Control of Msg1 of the 2-Step RACH

In some embodiments, a counter based solution can be considered or implemented for the transmission control of Msg1 in the 2-step random access procedure. In some embodiments, the UE may implement a counter in the MAC layer or physical layer. For each Msg1 transmission, the UE can increase the counter by 1. When the counter exceeds a maximum number of allowable transmission times, the UE can report a RACH failure.

In some embodiments, the counter and the maximum number of allowable transmission times can be configured according to following alternatives.

In a first alternative, one transmission counter and one maximum number of allowable transmission times are defined or configured (e.g., Transmax is defined for both the 2-step RACH and 4-step RACH). For each transmission of Msg1, regardless if it is Msg1 of the 2-step RACH or the 4-step RACH, the counter is increased by 1. For example, if counter>=(Transmax+1), the UE reports a RACH failure.

In a second alternative, one transmission counter and separate maximum number of allowable transmission times are defined or configured for the 2-step RACH and the 4-step RACH (e.g., transmax-2step for the 2-step RACH and transmax-4step for the 4-stepRACH). In the case that the transmax-2step is smaller than the transmax-4step, if transmission counter<=transmax-2step, the UE can initiate either a 2-step RACH or a 4-step RACH; if transmax-2step<transmission counter<=transmax-4step, the UE is only allowed to initiate the 4step RACH. Similarly, in the case that the transmax-4step<the transmax-2step, if transmission counter<=transmax-4step, the UE can initiate either a 2-step RACH or a 4-step RACH; if transmax-4step<transmission counter<=transmax-2step, the UE is only allowed to initiate the 2step RACH. If the counter is larger than max{transmax-4step, transmax-2step}, the UE reports a RACH failure.

In a third alternative, separate counters and separate maximum number of allowable transmission times are defined or configured. One total allowable transmax-total can be defined or configured. Separate counters and separate maximum number of allowable transmission times are maintained for the 2-step RACH and the 4-step RACH (e.g., counter-2stepRACH and transmax-2stepRACH are for the 2-stepRACH while counter-4stepRACH and transmax-4stepRACH are for 4stepRACH). The UE is not allowed to select 2-step RACH or 4-step RACH if the corresponding counter exceeds the configured corresponding maximum number of allowable transmission times. The UE reports a RACH failure when (counter-2stepRACH+counter-4stepRACH) exceeds transmax-total.

In a fourth alternative, a counter for Msg1 transmission (regardless it is Msg1 for 4-step RACH or Msg1 for 2-step RACH) and a maximum number of allowable transmission times for 2-step RACH can be configured, e.g., TransCounter, and transmax-2stepRACH. The counter can increase by 1 for each 2-step RACH attempt. After the first attempt of the 2-step RACH, the UE can only re-attempts 2-step RACH if the TransCounter<=transmax-2stepRACH. If the TransCounter>=transmax-2stepRACH+1, then UE only allows to perform 4 step RACH. Additionally, a maximum number of total allowable transmission time can be configured, e.g., transmax. If TransCounter>=transmax+1, then UE reports a RACH failure.

In a fifth alternative, a timer for reporting RACH failure can be introduced. The timer starts upon the first transmission of Msg1. During the running of timer, the UE can re-attempt RACH if needed. The timer stops upon successful completion of the RACH procedure. Upon expiry of the timer, UE reports a RACH failure.

In some embodiments, a combination of one or more of the above alternatives can also be considered or implemented. For example, one counter and one transmax can be configured; on top of that, a timer can be additionally configured. If either threshold is satisfied, the UE reports a RACH failure.

F. RA-RNTI for Reception of Msg2 of the 2-Step RACH

In some embodiments, after the transmission of Msg1, the UE can monitor corresponding search space with random access radio network temporary identifier (RA-RNTI), which is computed based on the RO in which the preamble part of Msg1 transmits.

The RA-RNTI associated with the PRACH occasion in which the Random Access Preamble is transmitted, can be computed as:

RA-RNTI=1+$s$_id+14×$t$_id+14×80×$f$_id+14×80× 8×$ul$_carrier_id, where s_id is the index of the first OFDM symbol of the PRACH occasion (0≤s_id<14), t_id is the index of the first slot of the PRACH occasion in a system frame (0≤t_id<80), fid is the index of the PRACH occasion in the frequency domain (0≤f_id<8), and ul_carrier_id is the UL carrier used for Random Access Preamble transmission (0 for NUL carrier, and 1 for SUL carrier).

In some embodiments of the present disclosure, the RNTI has a bitwidth of 16 bits. For the cases where the cell size is extensively large (e.g., a non-terrestrial network (NTN)) or the user density is very high (e.g., Internet of things (IoT) services), the bitwidth of RNTI can be extended to meet the connectivity requirements. Thus, some indications can be introduced to enable the usage of the long RNTI. For example, a one bit indicator (e.g., long-RNTI-enabled) can be introduced. In some embodiments, if the long-RNTI-enabled is set to '1', the long RNTI sequence can be used for scrambling; if the long-RNTI-enabled is set to '0', the normal RNTI sequence can be used for scrambling. Absent of this indicator, interpreted as the long-RNTI-enabled is set to '0', and normal RNTI sequence can be used for scrambling.

In some embodiments, the indication can be configured by following alternatives: (a) in a first alternative, the indication is included in master information block (MIB); (b) in a second alternative, the indication is included in system information block (SIB); (c) in a third alternative, the indication is configured per frequency band (e.g., for transmissions utilizing the frequency band configured with the "long-RNTI-enabled" being set to '1', the long RNTI sequence will be used for scrambling); and (d) in a fourth alternative, the indication is configured per PLMN.

In some embodiments, if the long RNTI is used, the system frame information of the RO in which preamble part of Msg1 transmits can be included in the formula of the RA-RNTI, which can be one of following: (a) LSB of SFN index; (b) SFN_index; (c) SFN_index mod N, where the SFN index equals the index of system frame number where the PRACH occasion starts, and the PRACH occasion is where the preamble part of Msg1 transmits. N is the smallest integer that is greater than or equal to the RAR window size in radio frames (e.g., if RAR window size takes up 2.5 radio frames, then N equals 3).

An example is provided below:

RA-RNTI=1+$s$_id+14*$t$_id+14*80*$f$_id+14*80* 8*$ul$_carrier_id+14*80*8*2*frame_id, where frame_id=SFN_index mod N; N is the smallest integer that is greater than or equal to the RAR window size in radio frames, which can be written as CIEL (RAR window size in radio frames); and SFN_index is the index of system frame number where PRACH occasion starts, and the PRACH occasion is where the preamble part of Msg1 transmits.

G. Content and Format of Msg2 of the 2-Step RACH

In some embodiments, the following alternatives can be considered or implemented with respect to the content and format of Msg2 of the 2-step random access procedure.

First Alternative for the Content and Format of Msg2

MAC subPDU in Msg2

In some embodiments, a Msg2 MAC protocol data unit (PDU) can include one or more MAC subPDUs and optionally padding. Each MAC subPDU can include one of the following: (a) a MAC subheader with Backoff Indicator only; (b) a MAC subheader and SuccessRAR; and (c) a MAC subheader and fallbackRAR.

Format for MAC Subheader

In some embodiments, the MAC subheader for Msg2 includes the following fields: (a) E: the Extension field is a flag indicating whether the MAC subPDU that includes this MAC subheader is the last MAC subPDU in the MAC PDU. In some embodiments, the size of the E field is 1 bit. (b) T: the Type field is a flag indicating the presence of the Backoff Indicator within the MAC subheader, the presence of MAC RAR after the MAC subheader, and the type of the corresponding MAC RAR if present (e.g., successRAR or fallback RAR). In some embodiments, the size of the T field is 2 bits. (c) BI: the Backoff Indicator field identifies the overload condition in the cell. In some embodiments, the size of the BI field is 4 bits. (d) R: Reserved bit, set to "0", in some embodiments.

In some embodiments, the definition of the 2bits T field can be implemented as follows: (a) "00": indicating the presence of a Backoff Indicator field in the subheader (BI); (b) "01": indicating the presence of a successRAR in the MAC subPDU; (c) "10": indicating the presence of a fallbackRAR in the MAC subPDU; and (d) "11": reserved. In some embodiments, the T field can also be used to indicate the presence of a MAC subPDU for the common configuration of the resource for the transmission of ACK of MsgB reception, and the value "11" of T field can be used in such case.

It should be understood that the value used for each case listed above is an example, and the mapping between the value and the case is not limited to the examples above. They are provided for illustrative purpose only and should not be regarded as limiting.

In some embodiments, the following two kinds of MAC subheader can be supported in the MAC PDU for the Msg1 response in 2-step RACH: (a) The MAC subheader with Backoff Indicator only, which includes four header fields: E/T/R/BI; and (b) The MAC subheader for successRAR and fallback RAR, which includes seven header fields: E/T/R/R/R/R/R.

Format for successRAR

In some embodiments, the successRAR is of a fixed size, and can include the following fields: (a) Contention Resolution ID: this field contains the UL common control channel (CCCH) service data unit (SDU). In some embodiments, if the UL CCCH SDU is longer than 48 bits, this field contains the first 48 bits of the UL CCCH SDU. In some embodiments, the size of the Contention Resolution ID is 48 bits. (b) Timing Advance Command (TAC): the same as the TAC field in MAC RAR for the 4-step RACH. In some embodiments, the size of the Timing Advance Command field is 12 bits. (c) C-RNTI (cell radio network temporary identifier): the C-RNTI allocated for the UE within the cell. In some embodiments, the size of the C-RNTI field is 16 bits. (d) R: Reserved bit, set to 0, in some embodiments. (e) In some embodiments, UL grant may be included in the successRAR, or some field to carry the configuration of resource for the transmission of ACK for MsgB reception.

Format for Fallback RAR

In some embodiments, the fallbackRAR is of a fixed size, and can include the following fields: (a) RAPID: The Random Access Preamble Identifier field identifies the transmitted Random Access Preamble. In some embodiments, the size of the RAPID field is 6 bits. (b) Timing Advance Command (TAC): the same as the TAC field in MAC RAR for 4-step RACH. In some embodiments, the size of the Timing Advance Command field is 12 bits. (c) UL Grant: the same as the UL Grant field in MAC RAR for 4-step RACH. In some embodiments, the size of the UL Grant field is 27 bits. (d) Temporary C-RNTI: the Temporary C-RNTI field indicates the temporary identity that is used by the MAC entity during Random Access. In some embodiments, the size of the Temporary C-RNTI field is 16 bits. (e) R: Reserved bit, set to 0, in some embodiments.

Second Alternative for the Content and Format of Msg2 MAC subPDU in Msg2

In some embodiments, a Msg2 MAC PDU includes one or more MAC subPDUs and optionally padding. Each MAC subPDU can include one of the following: (a) a MAC subheader with Backoff Indicator only; and (b) a MAC subheader with RAPID and MAC RAR, where the MAC RAR can be used to carry either the successRAR or fallback RAR.

Format for MAC Subheader

In some embodiments, the MAC subheader for Msg2 can include the following fields: (a) E: the Extension field is a flag indicating whether the MAC subPDU that includes this MAC subheader is the last MAC subPDU in the MAC PDU. In some embodiments, the size of the E field is 1 bit. (b) T: the Type field is a flag indicating the presence of the Backoff Indicator within the MAC subheader, and the presence of MAC RAR after the MAC subheader. In some embodiments, the size of the T field is 1 bit. (c) BI: the Backoff Indicator field identifies the overload condition in the cell. In some embodiments, the size of the BI field is 4 bits. (d) RAPID: The Random Access Preamble Identifier field identifies the transmitted Random Access Preamble. In some embodiments, the size of the RAPID field is 6 bits. (e) R: Reserved bit, set to "0", in some embodiments.

In some embodiments, the definition of the 1 bit T field in MAC subheader can be implemented as follows: (a) "0": indicating the presence of a Backoff Indicator field in the subheader (BI), and "1": indicating the presence of a MAC RAR in the MAC subPDU; Or (b) "1": indicating the presence of a Backoff Indicator field in the subheader (BI), and "0": indicating the presence of a MAC RAR in the MAC subPDU.

In some embodiments, the following two kinds of MAC subheader can be supported in the MAC PDU for Msg1 response in the 2-step RACH: (a) The MAC subheader with Backoff Indicator only, which includes four header fields: E/T/R/BI; and (b) The MAC subheader for successRAR and fallback RAR, which includes seven header fields: E/T/RAP ID.

Format for MAC RAR

In some embodiments, the MAC RAR is of a flexible size, and includes the one T field and the fields for successRAR or fields for fallback RAR. T: the Type field is a flag indicating the whether the fields for successRAR or the fields for fallbackRAR are included in the MAC RAR.

In some embodiments, the definition of the 1 bit T field in MAC RAR is as follow: (a) "0": indicating the MAC RAR includes the fields for successRAR, and "1": indicating the MAC RAR includes the fields for fallbackRAR; Or (b) "1": indicating the MAC RAR includes the fields for successRAR, and "0": indicating the MAC RAR includes the fields for fallbackRAR. In some embodiments, the size of T field can also be larger than 1 bit. If the T field is larger than 1 bit, besides the value used to indicate the MAC RAR including the field for successRAR or fallbackRAR, the other value can either be reserved for further use, or be used for other purpose.

In some embodiments, the fields of success RAR are included in the following information: (a) Contention Resolution ID: this field contains the UL CCCH SDU. In some embodiments, if the UL CCCH SDU is longer than 48 bits, this field contains the first 48 bits of the UL CCCH SDU. In some embodiments, the size of the Contention Resolution ID is 48 bits. (b) Timing Advance Command (TAC): the same as the TAC field in MAC RAR for 4-step RACH. In some embodiments, the size of the Timing Advance Command field is 12 bits. (c) C-RNTI: the C-RNTI allocated for the UE within the cell. In some embodiments, the size of the C-RNTI field is 16 bits. (d) R: Reserved bit, set to 0, in some embodiments. In some embodiments, UL grant may be included in the successRAR, or some field to carry the configuration of resource for the transmission of ACK for MsgB reception.

In some embodiments, the fields of fallback RAR are included in the following information: (a) Timing Advance Command (TAC): the same as the TAC field in MAC RAR for the 4-step RACH. In some embodiments, the size of the Timing Advance Command field is 12 bits. (b) UL Grant: the same as the UL Grant field in MAC RAR for the 4-step RACH. In some embodiments, the size of the UL Grant field is 27 bits. (c) Temporary C-RNTI: the Temporary C-RNTI field indicates the temporary identity that is used by the MAC entity during Random Access. In some embodiments, the size of the Temporary C-RNTI field is 16 bits. (d) R: Reserved bit, set to 0, in some embodiments.

H. Configuration of ACK Resource for Msg2 of 2-Step RACH

In some embodiments, for both solution 1 and solution 2 (alternative 1 and alternative 2 below), the acknowledgment (ACK) resource information can be included in Msg2 as well. With the ACK resource information included, the UE determines the resource for the transmission of the ACK for Msg2. In some embodiments, the following can be the solutions for the configuration of the ACK resource: (a) alternative 1: Separate MAC subPDU for common resource and explicit UE specific resource configuration in another separate MAC subPDU; (b) alternative 2: Separate MAC subPDU for common resource and implicit UE specific resource configuration in another separate MAC subPDU; and (c) alternative 3: UE specific ACK resource as part of success RAR.

In some embodiments, the configuration of common resource, or part of configuration of common resource can also be included in DCI, which is used to schedule the MsgB. In some embodiments, the ACK of MsgB reception can be carried on PUCCH, PUSCH or some other physical channels designed for the transmission of feedback specifically.

In some embodiments, for alternative 1 and alternative 2, the common MAC subPDU can be the time, and/or frequency, and/or code domain resource which can be used by multiple UEs, for which the corresponding successRAR can be found in the same Msg2. In some embodiments, the code domain resource refer to the code or sequence which will be used in the transmission of ACK of MsgB reception, including the generation of ACK signal.

In some embodiments, for alternative 1, some kind of UE specific resource configuration can be explicitly included in another separate MAC subPDU. In some embodiments, the explicit configuration resource can be at least one of the following: (a) Code domain resource, which can be used by the UE in the ACK transmission, or some parameters that can be used to calculate or derive the code domain resource that is to be used by the UE; (b) Frequency domain resource, which can be used by the UE in the ACK transmission, or some parameters that can be used to calculate or derive the frequency domain resource that is to be used by the UE; (c) Time domain resource, which can be used by the UE in the ACK transmission, or some parameters that can be used to calculate or derive the time domain resource that is to be used by the UE; and (d) Index of resource configured in the common MAC subPDU for the common resource, where a resource pool can be configured as the common resource. For example, in a common resource pool, it indicates code from X to Y are reserved for the transmission of the ACK, and in the UE specific resource configuration, an index can be used to indicate that the $n_{th}$ code is to be used for the transmission of the ACK.

In some embodiments, for alternative 2, some kind of UE specific resource configuration can be implicitly included in another separate MAC subPDU. In some embodiments, the implicit configuration resource can be at least one of the following: (a) UE derives the time domain resource based on the RAP ID (e.g., Random Access Preamble identifier corresponding to the transmitted PREAMBLE INDEX), or the sequence of MAC subPDU in the whole MAC PDUs in the Msg2, or the sequence of MAC success RAR in the whole MAC success RARs in the Msg2, or the sequence of MAC RAR in the whole MAC RARs included in the Msg2; (b) UE derives the frequency domain resource based on the RAP ID (e.g., Random Access Preamble identifier corresponding to the transmitted PREAMBLE INDEX), or the sequence of MAC subPDU in the whole MAC PDUs in the Msg2, or the sequence of MAC success RAR in the whole MAC success RARs in the Msg2, or the sequence of MAC RAR in the whole MAC RARs included in the Msg2; and (c) UE derives the code domain resource based on the RAP ID (e.g., Random Access Preamble identifier corresponding to the transmitted PREAMBLE INDEX), or the sequence of MAC subPDU in the whole MAC PDUs in the Msg2, or the sequence of MAC success RAR in the whole MAC success RARs in the Msg2, or the sequence of MAC RAR in the whole MAC RARs included in the Msg2.

In some embodiments, for alternative 1 and alternative 2 above, the corporation method of common resource and the UE specific resource can be as follows: (a) Alt1: the resource of the ACK can include the resource in time/frequency/code domain. Part of the resources can be configured as common resource and the rest can be configured as UE specific resource. For example, the common resource can include the resource in frequency and time domain, and the UE specific resource can include the resource in code domain. Alternatively, the common resource can include the resource in time domain, and the UE specific resource can include the resource in code domain and frequency domain. (b) Alt2: the common resource can include a pool of resource (e.g., a list of resource or a range of resource), and the UE specific resource can include an index to indicate one of the resource in the pool. (c) Alt3: a combination of Alt1 and Alt2. For example, the common resource can include the configuration of time and frequency resource, as well as a range or a list of code domain resource. The UE can determine the code domain resource based on some kind of index derived based on the UE specific resource configuration (in either explicit way or implicit way) and the range/list given in the common resource.

In some embodiments, to include the MAC subPDU for the common ACK resource, a new MAC subPDU is to be supported which includes a MAC subheader and ACK resources. In some embodiments, the definition of the 2bits T field in the MAC subheader can be implemented as follows: (a) "00": indicating the presence of a Backoff Indicator field in the subheader (BI); (b) "01": indicating the presence of a successRAR in the MAC subPDU; (c) "10": indicating the presence of a fallbackRAR in the MAC subPDU; and (d) "11": indicating the presence of ACK resource in the MAC subPDU.

It should be understood that the value used for each case listed above is an example, and the mapping between the value and the case is not limited to the examples above. They are provided for illustrative purpose only and should not be regarded as limiting.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method of random access comprising:
   transmitting, by a wireless communication device, a first message including a preamble and a data payload to a network; and
   receiving, by the wireless communication device from the network, a second message in response to the first message,
   wherein the second message is a MAC PDU that includes one or more MAC subPDUs, at least one MAC subPDU of the one or more MAC subPDUs including first MAC subheader and SuccessRAR, and
   wherein the SuccessRAR has a fixed size and comprises:
      a contention resolution identifier,
      a timing advance command (TAC),
      a cell radio network temporary identifier (C-RNTI),
      a reserved bit, and
      a configuration of an acknowledgement resource for transmission of an acknowledgment of receiving the second message.

2. The method of claim 1, wherein the configuration of the acknowledgement resource comprises:
   a code domain resource information,
   a frequency domain resource information, and
   a time domain resource information.

3. The method of claim 1, further comprising transmitting the acknowledgment of receiving the second message on a physical uplink control channel (PUCCH).

4. The method of claim 1, further comprising implementing, by the wireless communication device, a counter, the wireless communication device configured with a first maximum number and a second maximum number, wherein the first maximum number specifies a maximum number of allowable transmission times for the first message when transmitted in a 2-step random access procedure (RACH), and the second maximum number specifies a maximum number of total allowable transmission times for the first message when transmitted in a 2-step RACH or for another first message when transmitted in a 4-step RACH.

5. The method of claim 4, further comprising:
   increasing the counter by 1 for each 2-step RACH attempt to transmit the first message; and
   performing another 2-step RACH attempt if the counter is less than or equal to the first maximum number; or
   performing a 4-step RACH attempt if the counter is greater than or equal to the first maximum number+1.

6. The method of claim 5, further comprising:
   increasing the counter by 1 for each 4-step RACH attempt; and
   reporting a RACH failure in response to determining that the counter is equal to the second maximum number+1.

7. The method of claim 1, wherein each MAC subPDU of the one or more MAC subPDUs including one of (a) the first MAC subheader and the SuccessRAR, (b) a second MAC subheader with Backoff Indicator only, or (c) a third MAC subheader and fallbackRAR.

8. The method of claim 7, wherein at least one of the first MAC subheader, the second MAC subheader or the third MAC subheader includes at least one of (a) an extension field indicating whether the MAC subPDU that includes the MAC subheader is the last MAC subPDU in the MAC PDU, (b) a type field indicating the presence of the Backoff Indicator within the MAC subheader, the presence of MAC RAR after the MAC subheader, and the type of the corresponding MAC RAR if present, (c) a Backoff Indicator field identifying an overload condition in a cell, and (d) a reserved bit.

9. The method of claim 8, wherein the type field comprises two bits,
when set to "00", the type field indicates the presence of a Backoff Indicator field in the subheader, and
when set to "01", the type field indicates the presence of a successRAR in the MAC subPDU.

10. The method of claim 7, wherein the fallbackRAR has a fixed size and comprises:
a timing advance command (TAC),
an uplink (UL) grant,
a temporary cell radio network temporary identifier (C-RNTI), and
a reserved bit.

11. A wireless communication device comprising:
a processor; and
a memory storing executable instructions, the executable instructions when executed by the processor cause the processor to:
transmit a first message including a preamble and a data payload to a network; and
receive, from the network, a second message in response to the first message,
wherein the second message is a MAC PDU that includes one or more MAC subPDUs, at least one MAC subPDU of the one or more MAC subPDUs including a first MAC subheader and SuccessRAR, and
wherein the SuccessRAR has a fixed size and comprises:
a contention resolution identifier,
a timing advance command (TAC),
a cell radio network temporary identifier (C-RNTI),
a reserved bit, and
a configuration of an acknowledgement resource for transmission of an acknowledgment of receiving the second message.

12. The wireless communication device of claim 11, wherein the configuration of the acknowledgement resource comprises:
a code domain resource information,
a frequency domain resource information, and
a time domain resource information.

13. The wireless communication device of claim 11, wherein the executable instructions when executed by the processor further cause the processor to transmit the acknowledgment of receiving the second message on a physical uplink control channel (PUCCH).

14. The wireless communication device of claim 11, wherein the executable instructions when executed by the processor further cause the processor to implement a counter, the wireless communication device configured with a first maximum number and a second maximum number, the first maximum number specifying a maximum number of allowable transmission times for the first message when transmitted in a 2-step random access procedure (RACH), and the second maximum number specifying a maximum number of total allowable transmission times for the first message when transmitted in a 2-step RACH or for another first message when transmitted in a 4-step RACH).

15. The wireless communication device of claim 14, wherein the executable instructions when executed by the processor further cause the processor to:
increase the counter by 1 for each 2-step RACH attempt to transmit the first message; and
perform another 2-step RACH attempt if the counter is less than or equal to the first maximum number; or
perform a 4-step RACH attempt if the counter is greater than or equal to the first maximum number+1.

16. The wireless communication device of claim 14, wherein the executable instructions when executed by the processor further cause the processor to:
increase the counter by 1 for each 4-step RACH attempt; and
report a RACH failure in response to determining that the counter is equal to the second maximum number+1.

17. The wireless communication device of claim 11, wherein each MAC subPDU of the one or more MAC subPDUs including one of (a) the first MAC subheader and the SuccessRAR, (b) a second MAC subheader with Backoff Indicator only, or (c) a third MAC subheader and fallbackRAR.

18. The wireless communication device of claim 17, wherein at least one of the first MAC subheader, the second MAC subheader or the third MAC subheader includes at least one of (a) an extension field indicating whether the MAC subPDU that includes the MAC subheader is the last MAC subPDU in the MAC PDU, (b) a type field indicating the presence of the Backoff Indicator within the MAC subheader, the presence of MAC RAR after the MAC subheader, and the type of the corresponding MAC RAR if present, (c) a Backoff Indicator field identifying an overload condition in a cell, and (d) a reserved bit.

19. The wireless communication device of claim 18, wherein the type field comprising two bits,
when set to "00", the type field indicates the presence of a Backoff Indicator field in the subheader, and
when set to "01", the type field indicates the presence of a successRAR in the MAC subPDU.

20. The wireless communication device of claim 17, wherein the fallbackRAR has a fixed size and comprises:
a timing advance command (TAC),
an uplink (UL) grant,
a temporary cell radio network temporary identifier (C-RNTI), and
a reserved bit.

* * * * *